United States Patent
Patel

(10) Patent No.: US 11,084,356 B2
(45) Date of Patent: Aug. 10, 2021

(54) INNOVATIVE WINDSHIELD SUNSHADES CONFIGURATION AND SELECTION PROCESS

(71) Applicant: Rohan Vishnubhai Patel, Bensalem, PA (US)

(72) Inventor: Rohan Vishnubhai Patel, Bensalem, PA (US)

( * ) Notice: Subject to any disclaimer, the term of this patent is extended or adjusted under 35 U.S.C. 154(b) by 166 days.

(21) Appl. No.: 16/051,282

(22) Filed: Jul. 31, 2018

(65) Prior Publication Data

US 2019/0084382 A1    Mar. 21, 2019

Related U.S. Application Data

(63) Continuation of application No. 15/715,775, filed on Sep. 26, 2017.

(51) Int. Cl.
*B60J 1/20* (2006.01)
*E06B 9/24* (2006.01)

(52) U.S. Cl.
CPC .......... *B60J 1/2011* (2013.01); *B60J 1/2091* (2013.01); *E06B 9/24* (2013.01); *E06B 2009/2488* (2013.01)

(58) Field of Classification Search
CPC ......... B60J 1/2091; B60J 1/2011; E06B 9/24; E06B 2009/2488; G06Q 30/06; G06Q 30/08; G06Q 30/0641; G06Q 30/0643
USPC ................................. 705/26.1–27.2
See application file for complete search history.

(56) References Cited

U.S. PATENT DOCUMENTS

| | | | | |
|---|---|---|---|---|
| 4,815,784 A * | 3/1989 | Zheng | ................... | B60J 1/2091 160/329 |
| 5,024,262 A * | 6/1991 | Huang | ..................... | B60J 11/08 160/329 |
| 8,925,618 B2 * | 1/2015 | Zheng | ...................... | E06B 9/24 160/370.21 |
| 2004/0111276 A1 * | 6/2004 | Inge | .................... | G06Q 10/087 702/155 |
| 2011/0161182 A1 * | 6/2011 | Racco | ................... | G06Q 30/06 705/14.73 |

OTHER PUBLICATIONS https://web.archive.org/web/20140326235212/http://costcocouple.com/winplus-3-piece-auto-sunshade-kit/, 2016.*

(Continued)

*Primary Examiner* — Daniel P Cahn

(57) ABSTRACT

Disclosed is an improved sunshade configuration over the prior art. A Zig-Zag clamping mechanism for connecting two endpoints of each flexible oval-shaped loop can provide an additional flexibility and strength. With an oval-shaped or being other than round-shaped support structure allows better fitment in various configurations of a window. A size-selection process wherein by premeasuring windshield glasses where each size's fitments to list of vehicles of vise-versa. This methodology also can be applied to various accessories where an accessory is compatible with most but not all vehicles so a chart that provides guidance to consumers whether an accessory will be compatible with one specific year make model.

4 Claims, 13 Drawing Sheets

(56) References Cited

OTHER PUBLICATIONS

Retractable Auto Sun Shade—web page at <www.wholesalecarcovers.com/products-economy_car_cover.html>, 1 page, published on May 9, 2012.†
AutoGeek, web page at http://www.auto-geek.net/eclipse/eclipsenissan.html>, 3 pages, publsihed on Dec. 13, 2007.†
Dukutu, web page at <http://dikutu.ru/auto-expressions-sunshade-size-chart/>, 2 pages, published on Mar. 10, 2014.†
AutoGeek, Web page at <web.archive.org/web/20040921085144/http://www.autogeek.net:80/eclipseaudi.html>, 3 pages, published on Sep. 8, 2005.†
Gojerlamall, web page at <https://www.gojerlamall.com/index.php?main_page=product_info&products_id=22561>, 8 pages, published at least on Jul. 12, 2017.†
Jcwhitney, web page at https://web.archive.org/web/20170503214154/http://www.jcwhitney.com/ published on May 3, 2017.†
Ford Trucks, web page at <https://www.ford-trucks.com/forums/1444595-wheel-tire-bolt-pattern-lug-nut-information.html>, 1 page, published on Jul. 17, 2016.†
Docplayer—web page at< https://docplayer.net/docs-images/48/23875212/images/page_1.jpg, 1 page, published on Nov. 29, 2016.†
Wikimedia—web page at <https://commons.wikimedia.org/wiki/File:Rain-X_Auto_Car_Cover_Size_Chart_Box_Bottom.JPG., 1 page, published on Dec. 13, 2014.†
Aldireviewer—Web Page at <https://www.aldireviewer.com/auto-xs-car-suv-cover-size-charts/>, 1 page, published on Nov. 6, 2016.†

\* cited by examiner
† cited by third party

Fig.11

| | | |
|---|---|---|
| Size Chart for choosing a right size Sunshade | | |
| Buick | Medium | LaCrosse(05-16); Lucerne (06-11) |
| | Large | Century(97-05), Verano (12-17-11) |
| Cadillac | Medium | ATS(13-17); CTS(03-16), XTS(13-17) |

| Brand | vehicle information |
|---|---|
| Chevrolet | Camaro(10-18); Blazer/S10(82-94); Cavalier(82-94); Corvette(84-96); HHR(06-11) |
| Ford | Mustang(79-14); Mustang(79-14); Thunderbird(02-05) |
| Honda | Element(03-11); S2000(99-10) |

The vehicles that takes a Sunshade

INNOVATIVE WINDSHIELD SUNSHADES CONFIGURATION AND SELECTION PROCESS

CROSS-REFERENCE TO RELATED APPLICATIONS

This application is continued examination of non-provisional application Ser. No. 15/715,775 which claims the benefit of U.S. Provisional Application No. 62/376,708 filed on Aug. 18, 2016, and U.S. Provisional Application No. 62/530,999 filed on Jul. 11, 2017, which is incorporated by reference herein.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present invention relates to sunshades with a clamping mechanism. Shade's Fabric support wires for sun shade being oval from conventional round shape for a better fitment. An innovative size selection process for automotive accessories where an accessory would fit multiple vehicles but not all thus a chart that provides guidance to consumer weather an accessory should fit one specific vehicle or not.

Description of the Related Art

In the past, sun shades have been used to shield the interior of a car from sunlight and heat. Sunshades have also been used to provide a cover for visually concealing the contents of the passenger compartment. One example of a prior art sunshades is a simple cardboard sheet that is folded in an accordion-like fashion. These folding cardboard shades are typically unfolded and placed across the front sunshade of a car. Unfortunately, these prior art sunshade shades have a tendency to contract toward the initial folded position because of the creases in the cardboard. Additionally, even when fully folded, the accordion shades are somewhat bulky to pack and store.

As shown in FIG. 1, FIG. 2 and FIG. 3, Conventionally, sunshades 1 have a pair of closed loop flexible frames 2 that are covered and coupled by two opaque sheets of fabric material. The closed loop has two endpoints, which are fastened with a connector or fastener 3. The each closed loop has one fastener 3 for connecting the end points of each closed loop. These fasteners are not capable of holding the two end points of the closed loop for a long duration. When the fastener is damaged, then either of the two ends of closed loop comes out and damages the sunshade and Sunshade of the vehicle. These types of sunshades also have a hinge area that separates the frames, and thereby allows the frames to be placed on top of each other in order to twist and fold them into a plurality of smaller concentric loops which can be stored. Unfortunately, these prior art collapsible sunshades cannot cover a plurality of windows. Consequently, it is desirable to have a cost-efficient sunshade which has efficient clamping mechanism and saves cloth/metal needed in a construction of a Sunshade shade which otherwise would have wasted with conventional designs.

BRIEF SUMMARY OF THE INVENTION

It should be understood that this disclosure is not limited to the particular systems, and methodologies described herein, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

The present invention is directed to providing an improved sunshade over the prior art, by adding additional strength with a Zig-Zag clamping mechanism for connecting and securing the two endpoints of each flexible oval shaped loops to allow flexibility and strength. And and still utilizing materials that add superior reflective and insulating properties, plus a stronger vinyl backing for cosmetic appeal. The Zig-Zag clamping mechanism allows the sunshade the durability and strength to stay in position during its use.

The sunshade is comprised of three layers, one being the reflective insulating material on the outside, to block the sun's rays and protecting the interior of the vehicle from heat and sun damage. The second layer consists of at least two flexible oval shaped loops made of flexible material (for e.g a flexible metal strip or wire, spring metal and the like), each flexible oval shaped loops includes two endpoints connected by a Zig-Zag clamping mechanism. The at least two flexible oval shaped loops placed in proper support locations in the sunshade. With the final layer being the vinyl backing seen from the interior of the vehicle, giving a cleaner cosmetic look to sunshades.

With the added strength given by a Zig-Zag clamping mechanism to the sunshade can be folded in half and will back to its original position. The Zig-Zag clamping prevents the sunshade from folding over in extreme heat and extended use, thus allowing the sunshade superior durability over time.

It is an objective of the present invention to provide a Zig-Zag clamping mechanism can locate on each flexible oval shaped loop at the offset position to one another. Results in a ZIG ZAG kind clamping which bends the outer sleeve and a flexible metal wire placed in the oval-shaped closed loops a bit in a ZIG-ZAG manner so the strength of it doesn't weaken over the time period.

It is an objective of the present invention to provide a sunshade having at least two flexible oval shaped loops instead of round which helps to make a sunshade for taller glasses with the lesser material because ovals are taller and narrower in width. Thus require lesser width. The shade for taller sunshades also becomes more compact and user-friendly with ovals instead of circles.

It is an objective of the present invention to provide a method for selecting a Sunshade based on their vehicle by using a size chart. The sunshade dimensions can be pre-measured and have a chart where customers can find a size according to their maker, model and year of their vehicle. The size chart has details about every vehicle which includes maker (manufacture), model and year. So that customers can choose the Sunshade correctly.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a complete understanding of the present invention, reference is now made to the following descriptions taken in conjunction with the accompanying drawing, in which:

FIG. 11 illustrates a sizing instrument or chart for selecting a Sunshade based on their vehicle according to the various embodiments of the present invention.

FIG. 12 illustrates a sizing instrument or chart for selecting a Sunshade based on their vehicle according to the various embodiments of the present invention.

DETAILED DESCRIPTION OF THE INVENTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Some embodiments of this invention, illustrating all its features, will now be discussed in detail with respect to FIG. 4-FIG. 12

Figure 4:
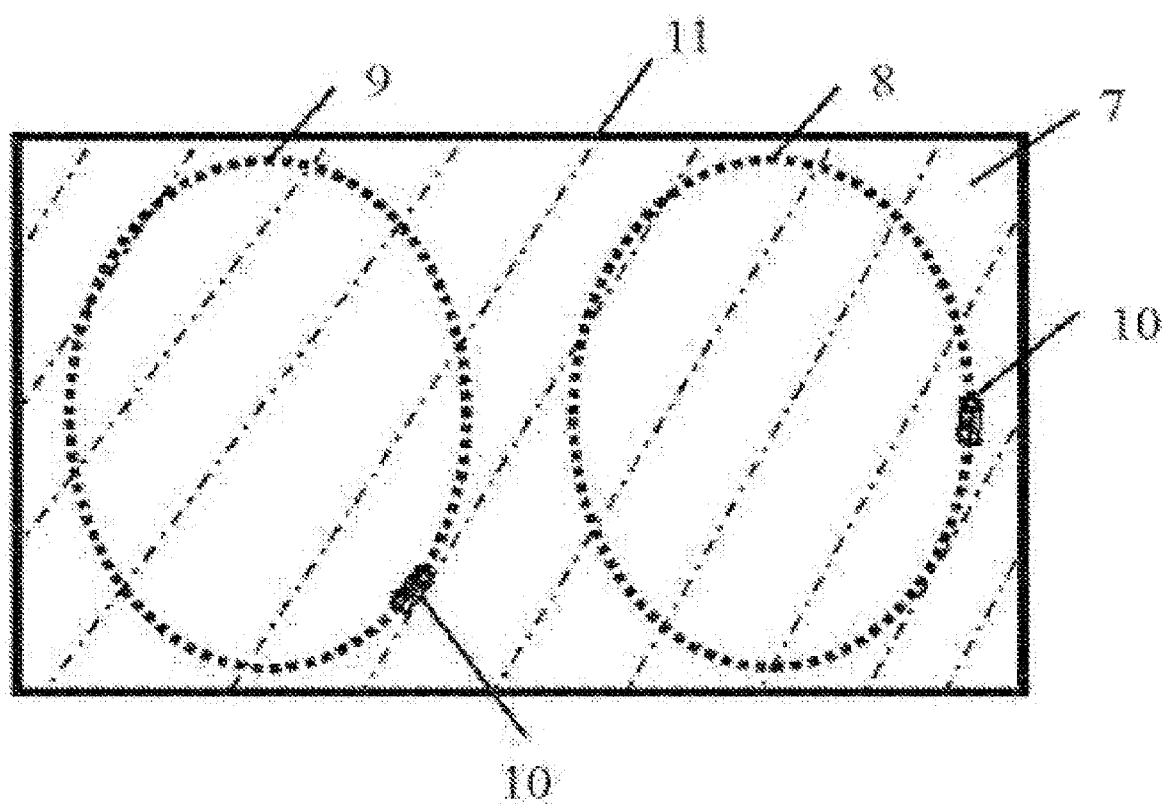
FIG. 4 illustrates a sunshade a having oval shaped closed loops and a Zig-Zag clamping mechanism for connecting the endpoints of the flexible oval shaped loops, according to the various embodiments of the present invention.
Figure 5:
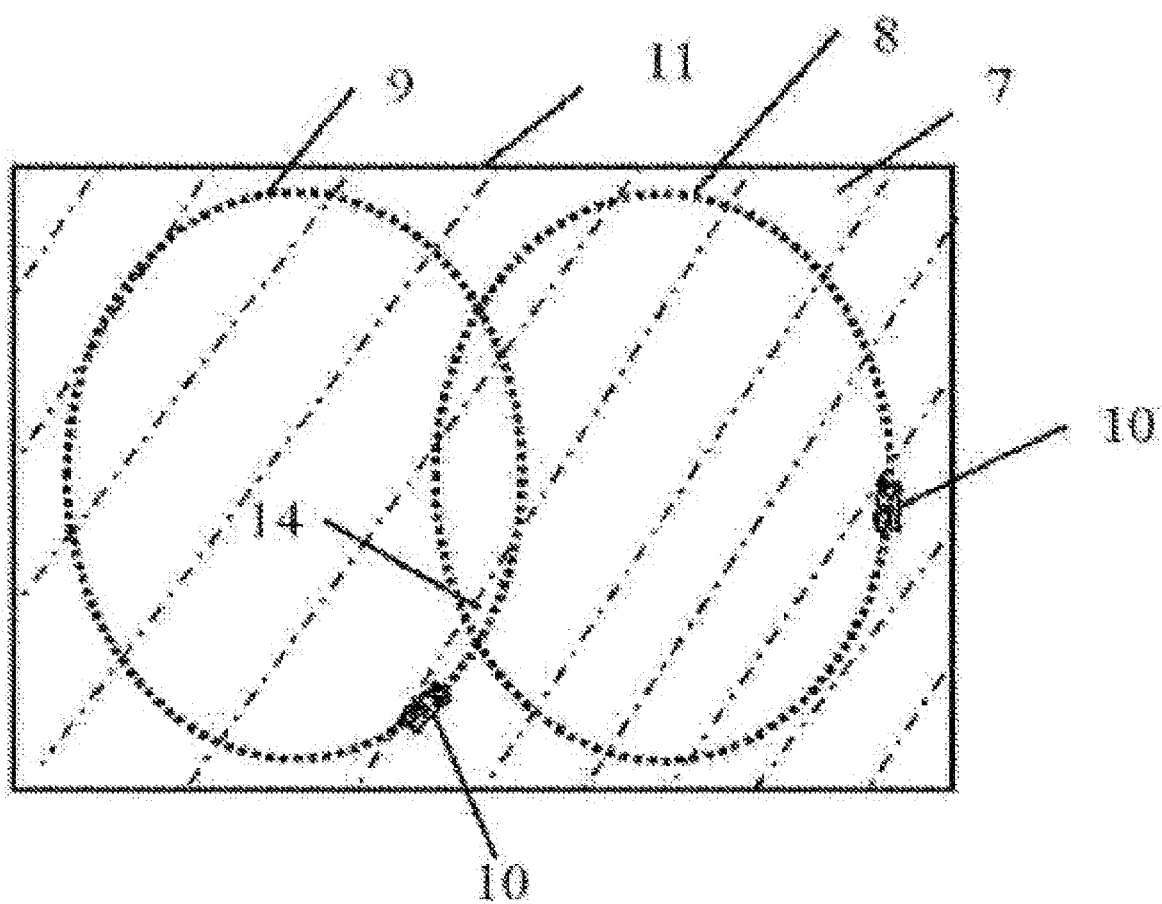
FIG. 5 illustrates a sunshade a having oval shaped closed loops and a Zig-Zag clamping mechanism for connecting the endpoints of the flexible oval shaped loops, according to the various embodiments of the present invention.

As shown in FIG. 4 and FIG. 5, a sunshade 11 is formed by a pair of resilient loop members 9 and 10 forming oval shape frames. The flexible loop members are retained in position by a peripheral loop portion of fabric 7 which includes an internal loop retaining structure. The fabric 7 is not in tension, but the fabric portion within the loop members 9 and 8 may be in tension. As an example, a pair of resilient loop members 8 and 9 forming oval shape frames may be provided by mechanically fastening (stitching), fusing, or gluing so that the loop frame members 8 and 9 are retained in position. The sunshade 11 is comprised of three layers, one being the reflective insulating material on the outside, to block the sun's rays and protecting the interior of the vehicle from heat and sun damage. The second layer consists of at least two flexible oval shaped loops 8 and 9 made of flexible material (for e.g. a flexible metal strip or wire, spring metal, flexible steel and the like), each flexible oval shaped loops 8 and 9 include two endpoints connected by a Zig-Zag clamping mechanism or device 10. The at least two flexible oval shaped loops 10 placed in proper support locations in the sunshade. With the final layer being the vinyl backing seen from the interior of the vehicle, giving a cleaner cosmetic look to sunshades.

Although the loops 9 and 8 are described as formed of flexible steel and other resilient material such as plastics, spring may be used. The term fabric is to be given its broadest meaning and may include woven fabrics, sheet fabrics or even films.

Figure 1:
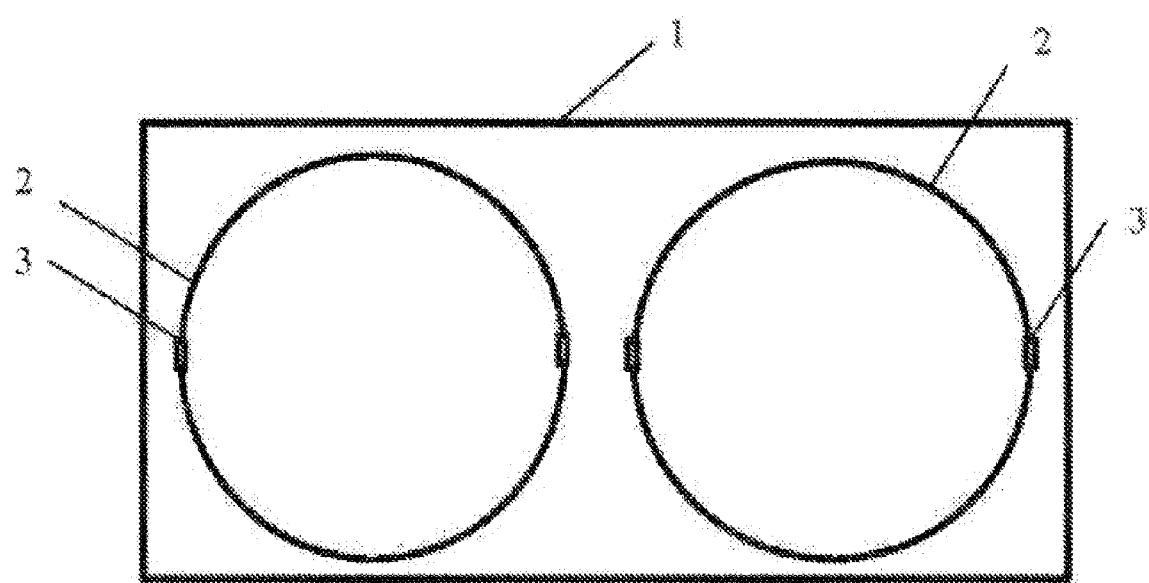
FIG. 1 is a prior art a sunshade having circular closed loops and conventional clamping mechanism, according to the various embodiments of the present invention.
Figure 2:
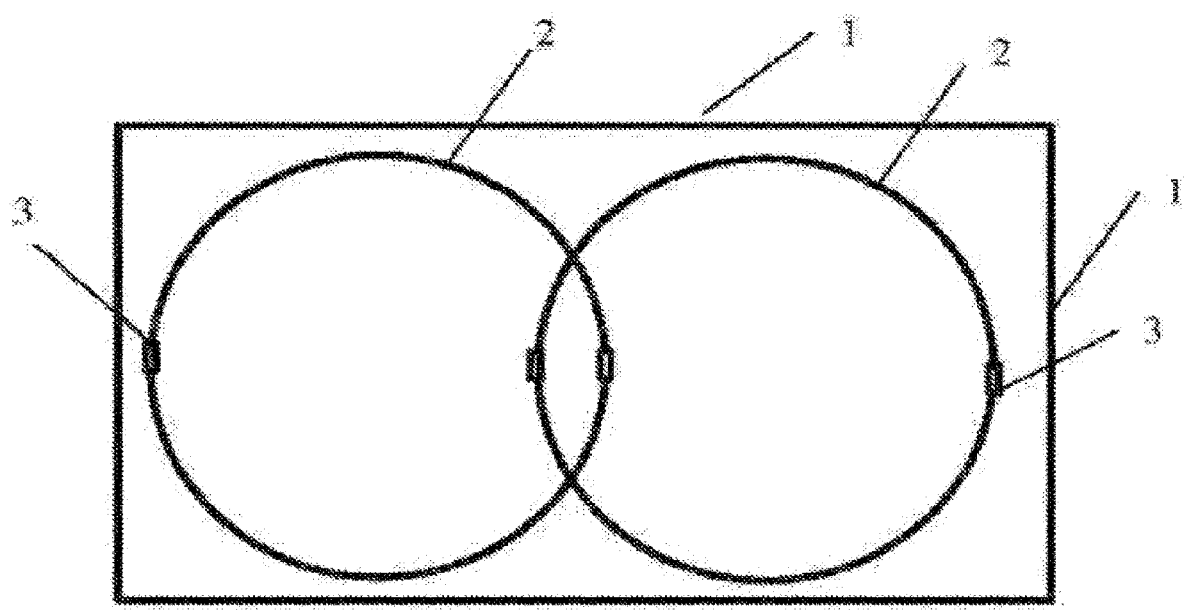
FIG. 2 is a prior art a sunshade having circular closed loops and conventional clamping mechanism, according to the various embodiments of the present invention.
Figure 3:
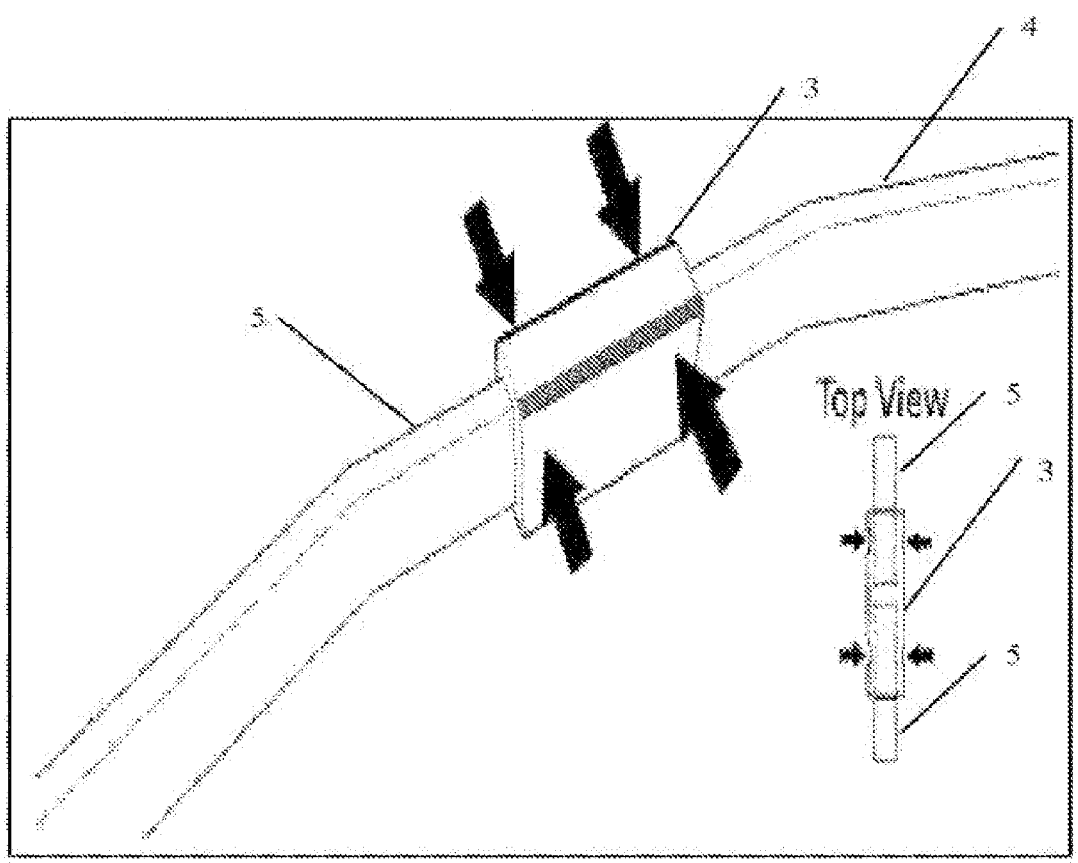
FIG. 3 is a prior art a sunshade having circular closed loops and conventional clamping mechanism, according to the various embodiments of the present invention.

As an exemplary embodiment, If we use the pair of oval sunshade shades as shown in FIG. 2 to be taller, lots of cloth wasted in overlap to make their use possible in narrow cars can be saved. The two oval-shaped sunshade shades are 33" in height, but only 26" in width (approx.)

So the total length of this shade is 1.5"+26"+2"+26"+1.5"=57". Minimum width possible for narrow cars with taller windshield=26"+26"−2(2")=48".

The total dimensions of a shade=57"×38"=about 33% savings in cloth material and 25% savings in length needed to make the metal circle.

This gives the versatility of taller sunshade shade in a compact design without making it bulky and costly in manufacturing cost thus retail cost.

Figure 6:
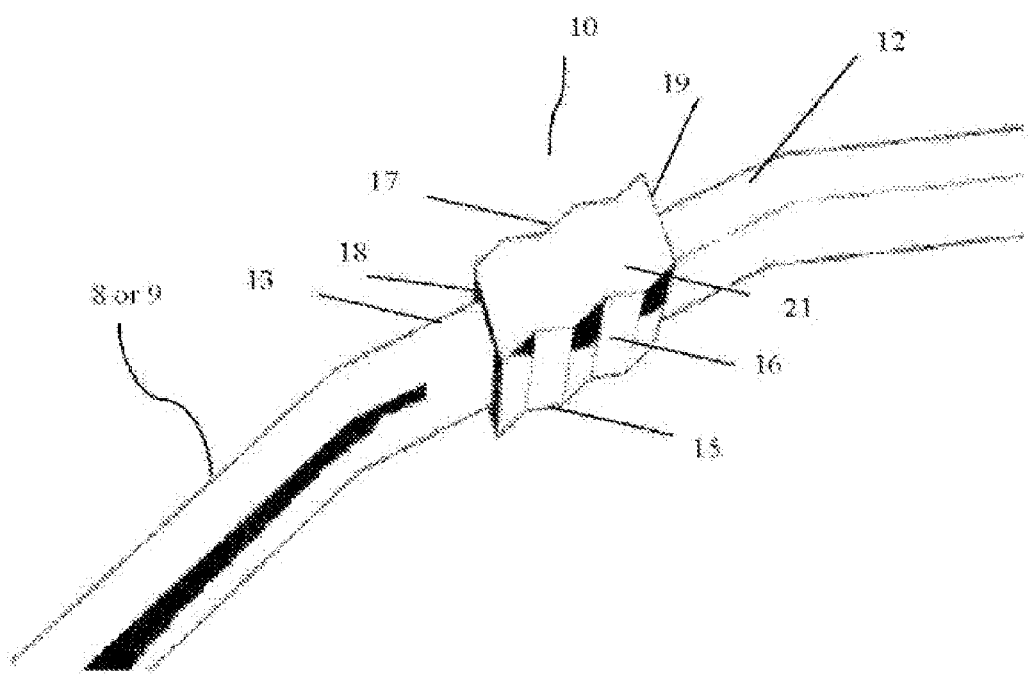
FIG. 6 illustrates an isometric and top view of a Zig-Zag clamping mechanism for connecting the endpoints of the flexible oval shaped loops, according to the various embodiments of the present invention.
Figure 7:
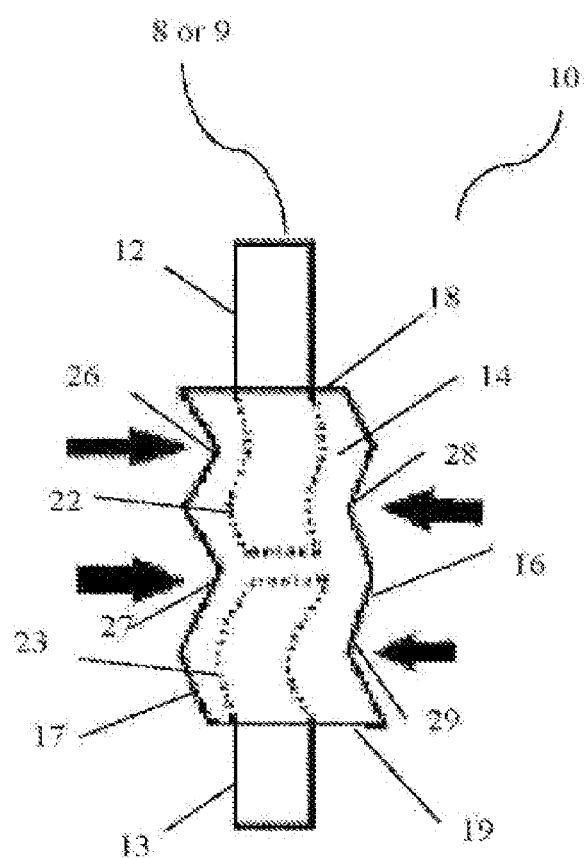
FIG. 7 illustrates an isometric and top view of a Zig-Zag clamping mechanism for connecting the endpoints of the flexible oval shaped loops, according to the various embodiments of the present invention.

FIG. 6 and FIG. 7 illustrates a specific design and function of the clamping device 10. It is to be appreciated that the flexible oval-shaped loop 8 and 9 may be formed by bending a straight piece of material and having the first endpoint 22 and second ends point 23 of the straight piece held together by clamping device 10 and outer portion of 12 and 13 of first and second endpoint are securely held by the clamping device 10. The ends of the frame 11 could be held in a rigid position, but as shown in FIG. 6 and FIG. 7, ends points 22 and 23 of the frame 9 and 8 may be received within clamping device 10 and formed flexible oval shaped loops 10 and thereby facilitates the manufacture of the Sunshade and allow for some flexibility.

In one embodiment of the present invention, FIG. 6 and FIG. 7 shows a zig-zag clamping device, which is used to securely hold the endpoints of the flexible oval-shaped loop 8 and 9 within the sunshade 11. The device zig-zag clamping device includes at least one flexible loop member 8 and 9 having a first endpoint 22 and a second endpoint 23. Further, the clamping device 10 includes a hollow enclosure made by a zig-zag shaped first side wall 16 and a zig-zag shaped second side wall 17, a top surface 21 and a bottom surface 15, a front wall 18 having a first inlet section for securely receiving the first endpoint 22 of the flexible loop member 8 or 9 and an rear wall 19 having a second inlet section for receiving the second endpoint 23 of the flexile loops member 8 or 9. The hollow enclosure is adapted to connect the first endpoint 22 and the second endpoint 23 of the flexible loop member in tight and securely manner.

In another embodiment of the present invention, the zig-zag shaped first side walls 16 and second wall 17 are adapted to bend slightly inside the hollow enclosure whenever received an external force is applied on pressing points 26, 27, 28, and 29 (as shown in FIG. 7 located off set on the zig-zag shaped first side walls. And as result of the external force, the zig-zag shaped first side walls 16 and second wall 17 are adapted to bend the first endpoint 22 and second endpoint 23 in zig-zag shape inside the hollow enclosure for creating a tight grip. The first endpoint 22 includes a first partial portion of the flexible loop member 8 or 9 connected to the first endpoint 22, which is inserted along with the first endpoint 22 into the hollow enclosure through the first inlet section located at front wall 18. Similarly, the second endpoint 23 includes a second partial portion of the flexible loop member 9 or 8 connected to the second endpoint 23, which is inserted along with the second endpoint into the hollow enclosure through the first inlet section located at rear wall 19.

Figure 8:
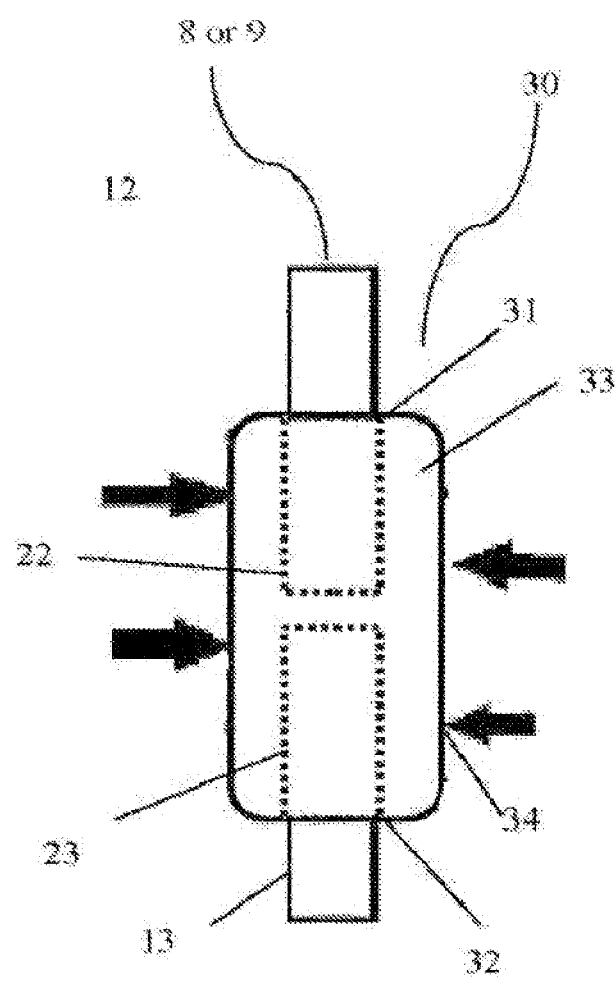
FIG. 8 illustrates a sunshade attached inside the windshield of the vehicle, according to the various embodiments of the present invention.
Figure 9:
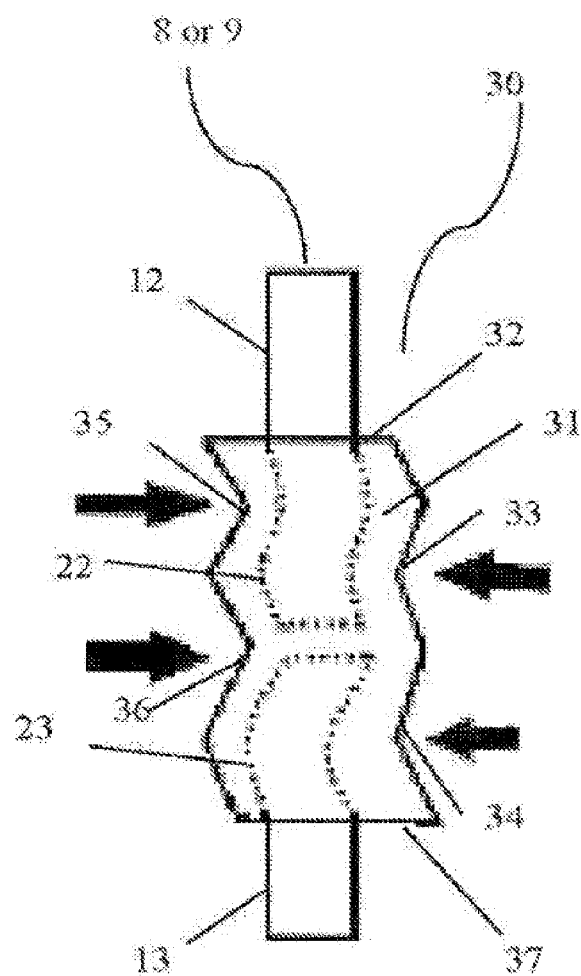
FIG. 9 illustrates a sunshade attached inside the windshield of the vehicle, according to the various embodiments of the present invention.

FIG. 8 and FIG. 9 shows another embodiment of the present invention, the FIG. 4A illustrate a flexible loop member clamped in a zig-zag manner by a clamping device 30. The clamping device 30 includes a hollow enclosure sleeve 31 includes a front opening 32 for receiving the first end point 12 of the flexible loop member 8 or 9 and a rear opening for receiving second end point 13 of the flexible loop member 8 or 9. The hollow enclosure sleeve 31 is made of metal. The hollow enclosure sleeve 30 includes opposite pressing points 33, 34, 35 and 36 placed offset to one another, wherein the hollow enclosure sleeve 30 being pressed at the opposite pressing points 33, 34, 35 and 36 resulting in a Zig-Zag structure formation at opposite pressing points 33, 34, 35 and 36 and bends the first endpoint 12 and second endpoint 13 in a zig-zag manner within the hollow enclosure sleeve as shown in FIG. 9. The hollow enclosure sleeve 30 is adapted to connect the first endpoint and the second endpoint of the flexible loop member in a tight and secure manner.

Figure 10:
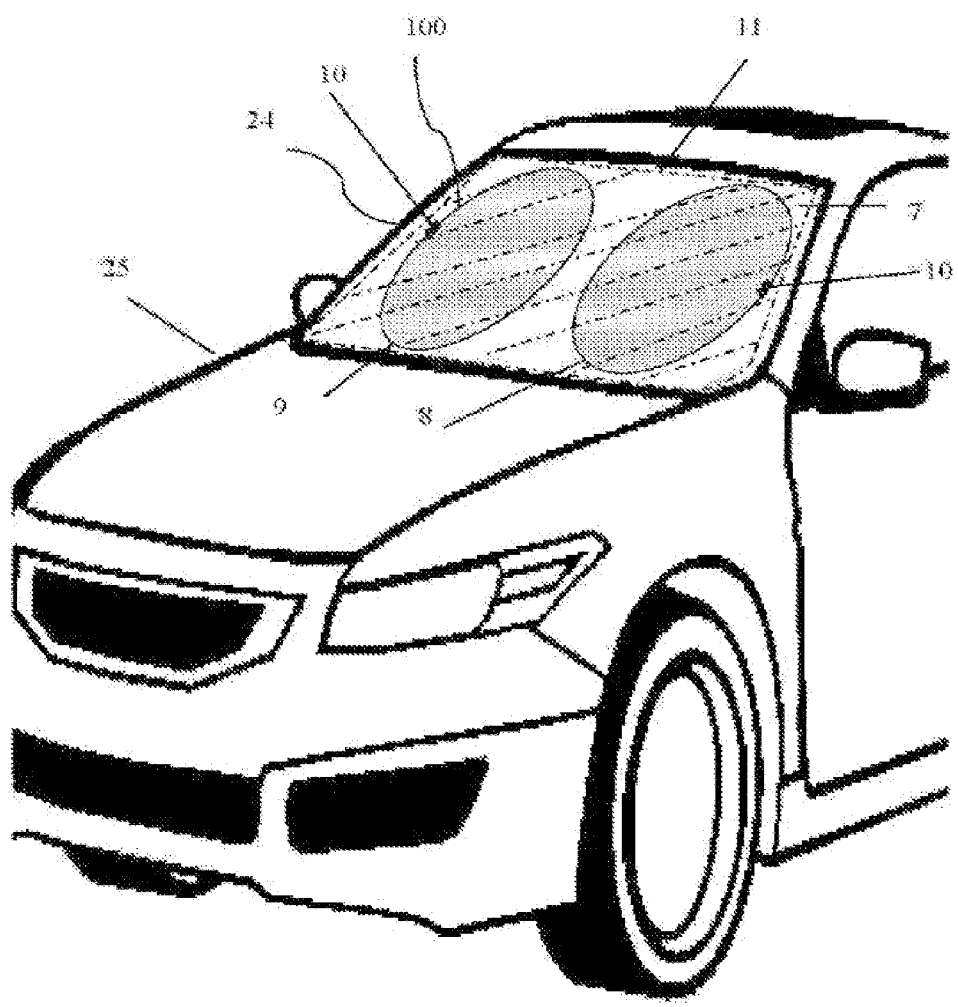
FIG. 10 illustrates the sunshade being retained behind the windshield of the vehicle, according to the various embodiments of the present invention.

As shown in FIG. 10 the sunshade 11 may be positioned behind a windshield 24 of a vehicle 25. The sunshade is held in position by a window frame and the sunshade 20 is positioned between a dashboard and a roof of the vehicle 25. Visors and rear view mirror may be used to help retain the sunshade 11 in position.

FIG. 10 illustrating the sunshade 11 in the dotted position being retained behind the windshield 24 between the dashboard and held in position by the visors and rear view mirror member. It is to be appreciated that the sunshade 11 may also be left in a reclining position against the steering wheel to provide some protection against the sun rays, but the preferred position is as shown in dotted line in FIG. 4.

In another embodiment of the present invention, the present provides a sunshade having at least two flexible loop members 8 or 9 for defining two separate oval shaped loops 9 or 8 connected by an overlapping portion acting as a hinge portion. A fabric 7 for substantially covering the two oval-shaped loops 8 or 9. Further separate fabric can be used for substantially covering the two oval-shaped loops 8 or 9 and sewed or attached together. The two separate oval-shaped loops 8 or 9 substantially supporting the fabric 7 in particular areas to provide for loop portions of the fabric maintained in the open position. The at least two separate oval shaped flexible loops 8 or 9 are being used to cover a driver side windshield window and a passenger side windshield window separately and are not connected by fabric. The flexible loop member has spring like properties. Further, the flexible loop member 8 or 9 may include "out of round" shape.

FIG. 11 and FIG. 12, another embodiment of the present invention, the present invention illustrates a sizing instrument or guidance chart for selecting a Sunshade based on the vehicle. The Sunshade dimensions can be pre-measured and have a chart where customers can find a size according to the maker, model and year of their vehicle. The sizing instrument or guidance chart has details about most vehicle which includes maker (manufacture), model and year. So that customers can choose the Sunshade correctly. The sizing instrument helps the customer or user for selecting a sunshade based on their vehicle information. The sizing instrument includes a first section 41 which displays at least one brand name, a second section 42 which displays at least one model information of the vehicle, and a third section 43 which displays at least one vehicle information which includes model year based on information displayed on the first section and the second section as shown in FIG. 11. Further, the sizing instrument display at least one vehicle information related to a particular size. Further, the vehicle information include, but not limited to brand name, manufacturer and manufacturer details, model year, model information, color, size of windshield or other window and the like. Same principle can be applied for a compatibility of any kind of automotive accessories which is compatible with multiple vehicles with a guidance chart.

Figure 13:
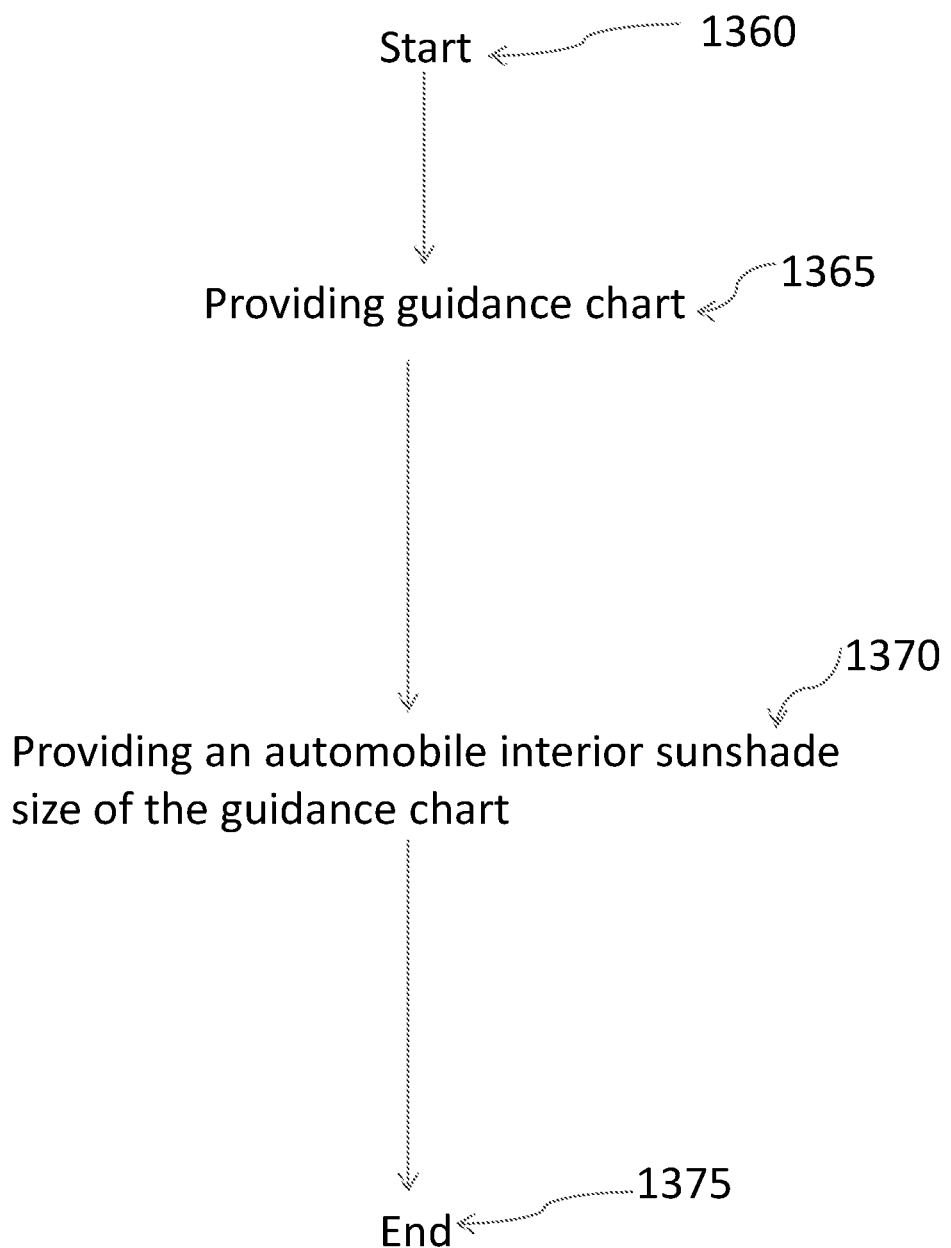
FIG. 13 illustrates an automobile interior sunshade guidance method.

FIG. 13 illustrates an automobile interior sunshade guidance method. Step 1365 is providing a guidance chart. step 1370 is providing the automobile interior sunshade size of the guidance chart.

The present invention provides an automobile sunscreen/Sunshade in which two or more adjacent fabrics covered oval shaped loops provide for an elongated shaped screen so as to conform to the shape of the automobile Sunshade or another window. To achieve the collapsed state, the Sunshade is first folded in half and then twisted and folded further, causing the loops to collapse within themselves, which forms a much smaller series of concentric loops and layers of fabric.

Although specific embodiments and certain structural arrangements have been illustrated and described herein, it will be clear to those skilled in the art that various other modifications and embodiments may be made incorporating the spirit and scope of the underlying inventive concepts and that the same is not limited to the particular methods and structure herein shown and described except in so far as determined by the scope of the appended claims.

What is claimed is:

1. An automobile interior window sunshade guidance method comprising the following steps:
   a. providing a guidance chart for at least two sizes of an automobile interior window sunshade, providing the chart on a display, wherein the guidance chart displays at least two vehicle models of a same maker and the at least two sizes of the automobile interior window sunshade;
   b. providing the guidance chart with a first section displaying the at least two vehicle models of the same maker and a second section displaying the at least two sizes of the automobile interior window sunshade, wherein at least two of the at least two sizes of the automobile interior window sunshade are displayed next to one another, wherein each of the at least two sizes of the automobile interior window sunshade is compatible with one of the vehicle models;
   c. providing the automobile interior window sunshade for each of the at least two sizes of the automobile interior window sunshade, each said sunshade includes a fabric covering at least one flexible steel flat wire loop member having a hollow enclosure, the hollow enclosure configured with opposite adjacent pressing points being offset to one another to form a zig-zag pattern configured to provide clamping, wherein the fabric has a fabric width, a fabric height and a fabric thickness, wherein both of the fabric width and the fabric height are greater than the fabric thickness;
   wherein each of the at least one flexible steel flat wire loop members consists of a flexible steel flat wire and the hollow enclosure;
   the flexible steel flat wire having two wire width sides and two wire thickness sides, wherein each of the two wire width sides is greater than each of the two wire thickness sides;
   the hollow enclosure having two enclosure width sides and two enclosure thickness sides, wherein each of the two enclosure width sides is greater than each of the two enclosure thickness sides;
   wherein the hollow enclosure accommodates a first end point and a second end point of the flexible steel flat wire within, wherein the zig-zag pattern of the hollow enclosure is configured to secure each of the first end point and the second end point of the flexible steel flat wire to the hollow enclosure independently without overlapping of the first end point and the second end point to one another to form the at least one flexible steel flat wire loop member;
   wherein the zig-zag pattern of the enclosure is pressed into the first end point and the second end point to form bends adjacent the opposite adjacent pressing points, wherein each of the opposite adjacent pressing points presses in against only the two wire width sides;
   wherein the two enclosure thickness sides and the two wire thickness sides do not have any of the opposite adjacent pressing points therein, wherein each of the at least one flexible steel flat wire loop members is covered by the fabric;
   wherein each of the sunshades is configured to be folded in half and then twisted and folded further to cause the loops to collapse within themselves to form a collapsed state.

2. The automobile interior window sunshade guidance method of claim 1, wherein each of said at least one flexible steel flat wire loop member of each said sunshade includes at least two flexible steel flat wire loop members, wherein each of the two flexible steel flat wire loop members are sewed on the fabric.

3. The automobile interior window sunshade guidance method of claim 2, wherein the guidance chart is provided on a web-display.

4. The automobile interior window sunshade guidance method of claim 2, wherein said at least two flexible steel flat wire loop members are connected with a hinge portion.

* * * * *